Aug. 9, 1938.    R. S. DRUMMOND    2,126,178
ROTARY GEAR CUTTING TOOL
Filed Dec. 2, 1935    5 Sheets-Sheet 1

FIG. 1.

INVENTOR
ROBERT S. DRUMMOND
BY
ATTORNEYS

INVENTOR
ROBERT S. DRUMMOND
BY Whittemore Hulbert Whittemore
& Belknap ATTORNEYS Patented Aug. 9, 1938

2,126,178

UNITED STATES PATENT OFFICE 2,126,178

ROTARY GEAR CUTTING TOOL

Robert S. Drummond, Detroit, Mich.

Application December 2, 1935, Serial No. 52,566

8 Claims. (Cl. 29—103)

The invention relates to rotary gear cutters adapted for use in finishing gears by a cutting or shaving method as outlined in my applications, Serial No. 626,768, filed July 30, 1932 and Serial No. 3,662, filed January 26, 1935. This application is a continuation in part of said prior applications.

The principal object of the invention is to provide an improved form of rotary cutting tool which is adapted to accurately finish the gears.

Another object of the invention is to obtain a rotary gear cutter of such form that it can be manufactured with high degree of accuracy at a reasonable cost on a commercial basis.

A further object of the invention is to provide improvements in a rotary gear cutter which enable the same to more accurately finish gears than any type of cutter heretofore known.

The invention also relates to methods for manufacturing the cutter and methods for utilizing the same to obtain new and improved gear finishing.

The new rotary cutting tool may be constructed in various different ways depending upon the type of gear finishing which is desired and I will therefore describe many modifications, all of which embody the underlying invention.

Figure 1:
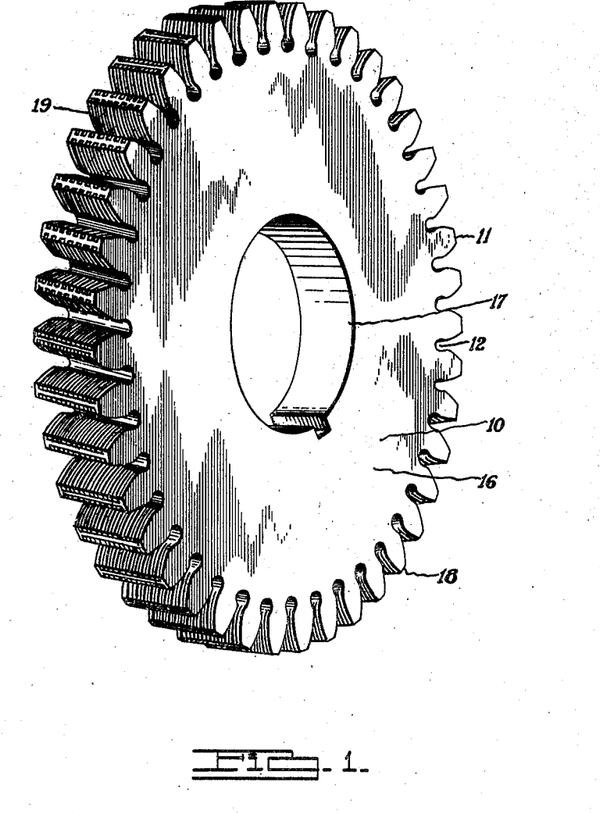
Figure 1 is a perspective view of a helical cutter embodying my invention.
Figures 2, 3, 4, 5, 6, 7:
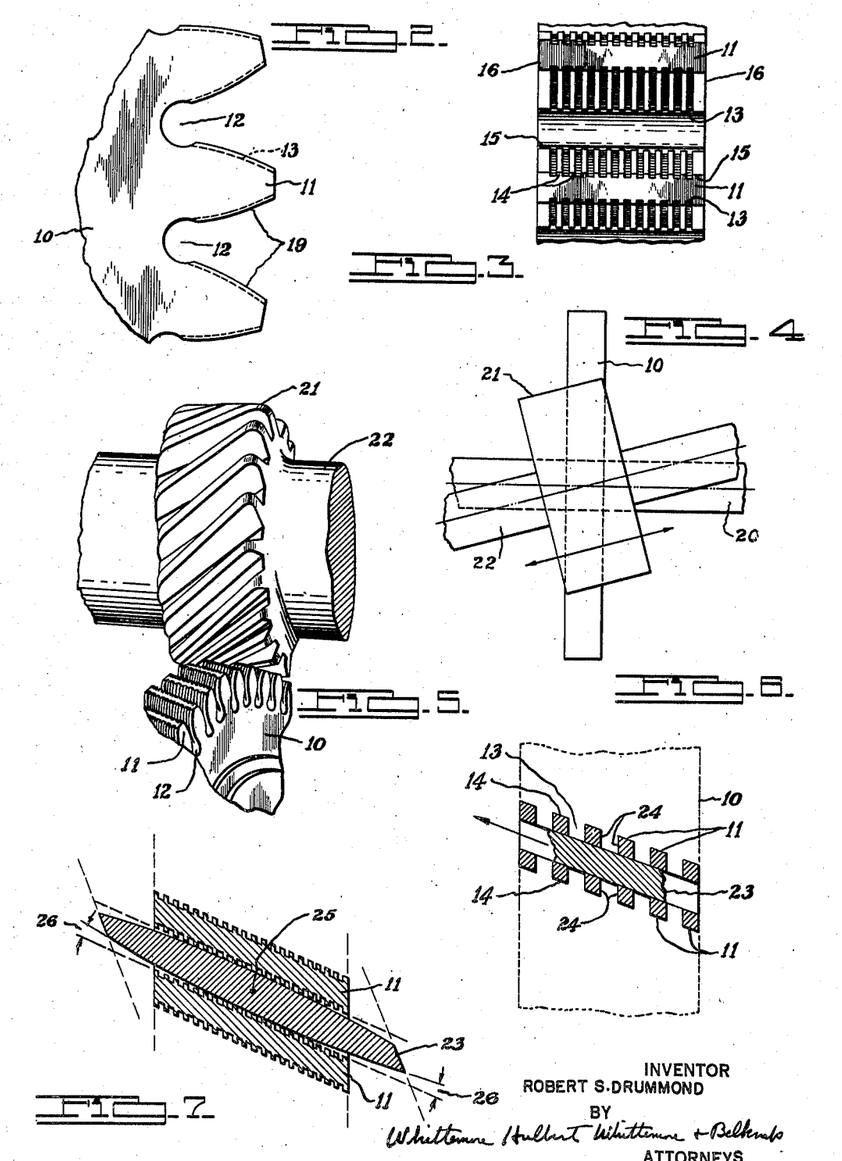
Figure 2 is a fragmentary side view thereof.
Figure 3 is a fragmentary edge view of a spur cutter.
Figure 4 is a diagrammatic view showing the crossed axes relation of the cutter and the gear when the cutter is being used.
Figure 5 is a perspective view showing the cutter of Figure 1 in operative relation to a helical gear to be finished.
Figure 6 is a diagrammatic view representing the developed pitch plane of a gear and cutting tool illustrating the cutting action.
Figure 7 is another diagram showing the cutting action.
Figures 21, 22, 23, 24:
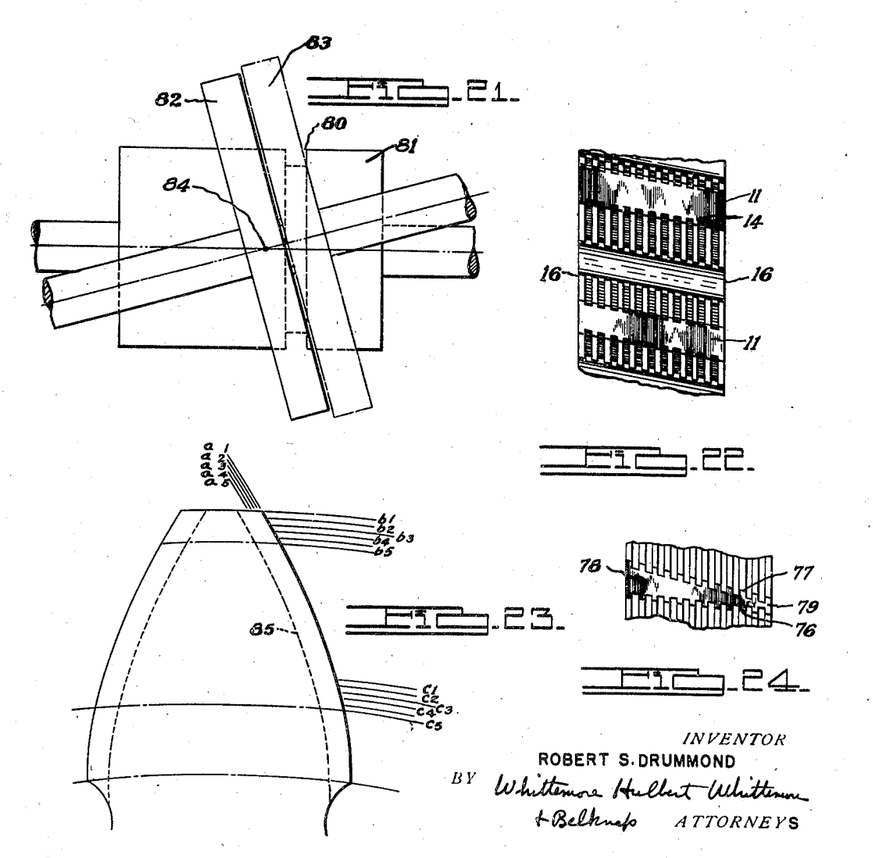
Figure 21 is a diagrammatic plan view illustrating an arrangement for cutting interrupted gears.
Figure 22 is a fragmentary edge view of the cutter shown in Figure 1 modified to have the end lands of the same width as the intermediate lands.
Figure 23 is a diagram of a gear tooth of the cutter illustrating the method of resharpening the cutter.
Figure 24 is a diagram illustrating a cutter tooth of different helical angle on the opposite sides thereof.

One of the preferred constructions embodying my invention is illustrated in Figures 1 and 2. The tool is designated by the reference character 10 and is preferably formed from a forged high speed steel blank. The blank has formed in the periphery thereof teeth 11 which may either be spur gear teeth as shown in Figure 3, or preferably helical gear teeth as shown in Figure 22. The teeth are formed in the blank by hobbing to a slightly greater size than is desired in the finished cutter and at the roots of the teeth the blank is provided with a series of transversely extending holes 12, the diameter of which is greater than the normal width of the bottom of the tooth slots thus providing a cylindrical relief slot, the purpose of which is hereinafter more fully discussed.

The sides of the gear teeth are provided with a series of serrations 13 extending from the tops of the teeth to the clearance slots 12. These serrations are preferably closely spaced to form intermediate lands 14 of approximately the same width as the width of the serrations. As an example of one form of tool coming under my invention, the width of the slots and the width of the lands are each .035 inch. The depth of the serrations is also .035. In order to strengthen the rotary cutting tool the thickness of the lands 15 (see Figures 3, 17 and 18) adjacent the end faces of the gear is greater than the intermediate lands 14, for example .070 inch.

The cutting tool as described after having been formed with the serrations and root relief as described is then heat treated to give the desired physical properties and is subsequently finished to give extreme accuracy to the gear teeth. The side faces 16 of the tool are ground to accurate parallelism while the inside diameter 17 of the central aperture and the outside diameter 18 of the gear teeth are finish ground. The side faces 19 of the gear teeth are then accurately ground to the exact profile desired, which while in general is of involute curvature is nevertheless preferably modified as hereinafter more fully set forth to give the exact curvature desired. The rotary cutting tool manufactured in accordance with the general directions given above is one form of my invention. It will be noted that while the profile of the teeth is accurately finish ground, the serrations 13 intermediate the lands 14 are not ground, but retain the surface characteristics of the steel which has been heat treated but not subsequently finished. Similarly the cylindrical surfaces of the relief slot 12 are unground and have the same surface characteristics.

As heretofore stated, the rotary cutting tool of this invention is adapted to be used for shaving or cutting of gears according to the general methods outlined in my co-pending applications above referred to. In use the cutter is mounted upon an arbor 20 and brought into intermeshing relationship with the roughed-out work gear 21 which is to be finished. The work gear is mounted on a suitable arbor 22, the axis of which is crossed with respect to the axis of the cutter arbor 20 with an angularity preferably between 3° and 30°. The work gear and rotary cutting tool are rotated together in the manner of intermeshing gears, suitable means being provided for driving one of the members, which member in turn drives the other member by the intermeshing action of the teeth. Preferably the cutter is the driving member and the work gear is the driven member. During the rotation of the gear and cutter, pressure is maintained between the same to force both sides of the teeth of the cutter to contact with the teeth of the work gear. This cramp action causes both sides of the work gear teeth to be simultaneously finished. During the rotation of the gear and cutter a feed movement is imparted to one in the direction of the axis of the gear. Preferably this feed movement is in the form of a reciprocating motion of sufficient amplitude to cause the cutting edges of the finishing tool to traverse the entire width of the work gear without permitting the work gear to pass out of contact with the finishing tool. At the end of the reciprocation in one direction the feed is automatically reversed and at the same time the direction of rotation of the cutter is preferably reversed. During the rotation and reciprocation the gear and cutting tool are periodically adjusted toward each other until the desired amount of metal has been removed from the surface of the work gear.

One of the characteristic features of the finishing action obtained by the use of the improved cutter is that the work gear is finished with a rotary tool and the accuracy of the work is predicated mainly upon the accuracy of the rotary tool itself as distinguished from the usual forms of gear cutting operations wherein the timing is a major feature. It should be noted that the cutting portions of the finishing tool are always located between guiding surfaces and the finishing tool therefore acts not only as a cutter but also as a guide for insuring extreme accuracy of the cut. This action is illustrated in Figure 6 which is a diagram representing the development of the pitch plane of the gear and cutter. The gear 21 to be finished is shown above the cutter 10, the axes being arranged at an angle between 3° and 30°. The tooth 23 of the work gear is represented as intermeshing between the two adjacent cutter teeth 11. When the work gear tooth is caused to move in the direction of the arrow (see Figure 6) with respect to the cutter teeth, the cutting edges are as indicated at 24 formed by the intersection of the lands 14 with the sides of the serrations 13. While the cutting action takes place on these cutting edges it will be observed that the gear tooth 23 bears against the lands 14 on opposite sides of the gear tooth and on both sides of the cutting edges 24, thus accurately positioning the gear tooth 23 with respect to the tooth profiles of the cutting teeth 11.

Figure 8:
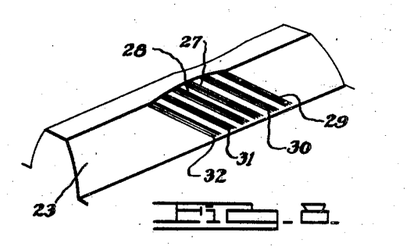
Figure 8 is a diagram of a work gear tooth in perspective showing the cutting action of the rotary cutter when it is run with a work gear without relative axial feed movement.

Figure 7 is another diagram illustrating the cutting action showing the gear tooth 23 between adjacent teeth 11 of the cutter. The center of crossed axes is located at 25 and at this point there is the greatest pressure of contact between the cutter and the gear because the surfaces of the cutter teeth and the gear tooth contact as arcs of circles and as shown the maximum pressure is at the center of the crossed axes and there is backlash as indicated by the dimension 26 where the gear tooth 23 leaves the contact with the cutter. This contact between the cutter teeth and the gear tooth, as will be noted in the diagram, is on a circular arc which develops a cutting action as shown in Figure 8 in which the center cuts 27 and 28 are deeper than the outer cuts 29, 30, 31 and 32 respectively. The reciprocating feed movement carries this area of greatest contact across the sharp edges of the cutter and spreads the finished surface across the entire gear tooth 23.

In order to explain the characteristics of the cutting tool of my invention it is necessary to understand certain principles relating to the use of the tool for crossed axes cutting. As far as I am aware, these principles were unrecognized prior to my invention.

Figure 9:
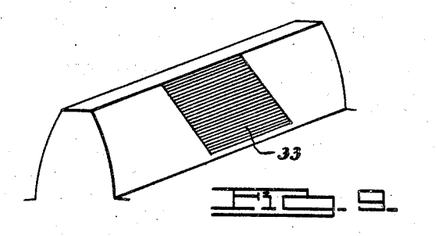
Figure 9 is a diagram illustrating the band of contact on a spur gear when mating with a helical gear in a crossed axes relationship.
Figure 10:
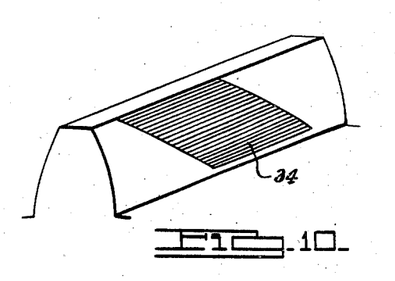
Figure 10 is a diagram illustrating the band of contact on a helical gear when mating with another gear in a crossed axes relationship.

In Figure 4 I have shown the crossed axes relation between the rotary cutting tool and the work gear. The teeth of the mating gears in this relation do not contact over their entire face width but contact in certain well defined paths which are different for gears of different characteristics. The band of contact on a spur gear when run with a mating gear of a different angle is substantially parallel to the line of rotation of the spur gear, varied only by the angular setting, as indicated at 33 in Figure 9. The band of contact on a helical gear extends at an angle to the tooth face as indicated at 34 in Figure 10. The angle of the band is a function of the helix angle of the gear. The width of the band of contact is determined by the difference in helix angle of the mated gears, that is the angularity of the crossed axes, being full width on spur running with spur, or helical running with helical of equal angles, and being narrow when 45° right hand is running with 45° right hand which gives, theoretically, a point of contact and generates, theoretically, a line. The band of contact between zero and 10° crossed axes is wide. The band of contact between 15° and 25° crossed axes is fairly wide. The band of contact above 30° crossed axes is narrow. The center of the band of contact is the point of greatest pressure while at the outer edges of the band there is the point of minimum pressure. These bands of contact are formed both on the work gear and on the gear cutter, being characteristic of the helix angle of the work gear and the gear cutter respectively. When the cutter and gear are run together without axial feed movement and under cramp action, that is with pressure between the same, the cutter teeth sink into the teeth of the work gear and mark the gear as indicated in Figure 8. The individual teeth on the cutter sink in to different depths, the greatest being in the middle at the center of the band on the work gear. The cutter teeth at the outer edges of the cutter gear will not even touch the tooth face of the work gear.

Figure 11:
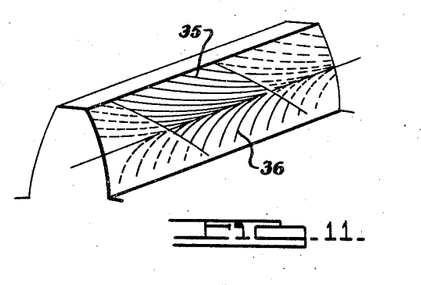
Figure 11 is a diagram illustrating the path of the cutting edges when cutting a helical gear.
Figures 12, 13, 25, 26:
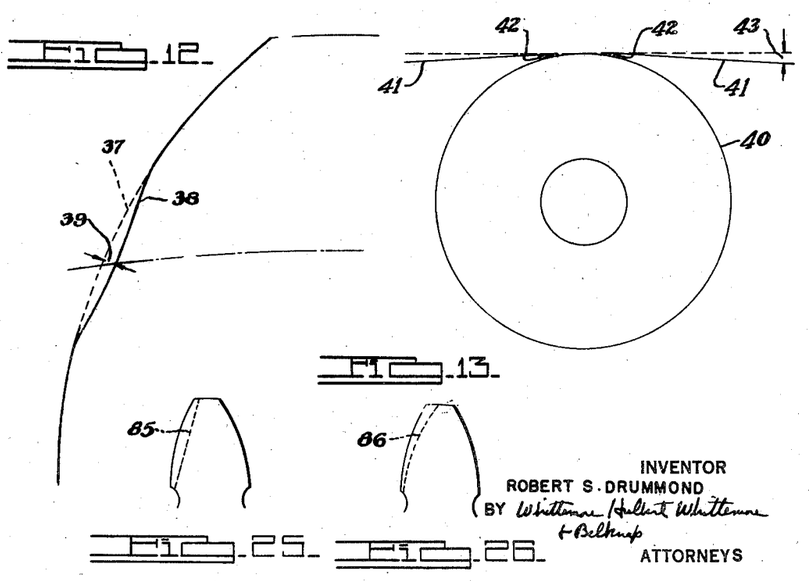
Figure 12 is an exaggerated diagram showing the modified profile of the gear teeth of the rotary cutter used for obtaining a true involute curve on the work gear teeth.
Figure 13 is a diagram illustrating one method of obtaining the modified tooth profile in the rotary cutter.
Figure 25 is a diagram of a cutter tooth showing a modified form of serration.
Figure 26 is a similar diagram with another modified arrangement of serration.

The relative motion between the surfaces of the teeth of the cutter and the teeth of the work gear is, as shown in Figure 11, on a curved line 35 starting at the top of the tooth and having a curved contact until at the pitch line the relative motion is parallel to the pitch line. The curve then reverses along the pitch line and dips down toward the bottom of the tooth as indicated at 36. Due to the relative motion between the parts as described, the teeth of the cutter gear at the upper part of the work tooth are cutting in one direction, say right hand, and in the lower part of the tooth are cutting on a left hand edge, and at the pitch line the blade will first cut to the right and then cut to the left when it reverses. Due to this reverse cutting action when the crossed axes have a sufficient angularity, the blades have a tendency to remove more material at, or near the pitch line than occurs at the top and bottom of the work teeth, creating what is called a hollow profile. This does not occur normally in hobs or shaper cutters. The rotary cutting tools of this invention are normally modified in tooth contour so that the profile on the cutter is hollowed out to the amount which will compensate for this double cutting near the pitch line. This is illustrated in Figure 12 where 37 represents a true involute curve and 38 the modified curve used for the tooth profile of my rotary cutter. The distance 39 between these curves at the pitch line is dependent on various conditions but may normally be within the range from .0003 to .0015 inch.

One way in which this may be accomplished is illustrated in Figure 13. The profile of the cutter teeth is normally generated by finish grinding with a machine utilizing metal tapes to secure a theoretically correct involute curve. To suitably modify this curve so that it will cut a perfect gear with 15° crossed axes, the base circle 40 for the tapes 41 is made slightly undersize, say .006 inch on the radius. Beneath the tapes one or more shims 42 of .006 inch thickness are properly located to give the desired generating action. In order to relieve the high tips on the profile of the gear at the root diameter and top of the tooth, it is customary to lower the supports for the tapes below their proper tangent position an amount 43, say ½ inch or more, causing a blending action to take place when generating the involute. The effect of this is to obtain an involute curve of correct profile using the .006 shim and having this profile blend into the profile above and below the point where the shim is effective.

Due to the relatively deeper cutting at the center of the band of contact on the work gear, the cutting action during the feeding of the gear along the gear axis may be explained. This spreads the cutting action over the entire face width of the work gear tooth and causes a uniform finishing action over the entire tooth. As the gear slowly moves across, a series of cutting actions take place on each cutting edge up to the center cutting edge of the tool which has the greatest depth. The lands beyond this center edge act as guides on the finished surface. The first blades which approach the surface of the gear are subjected to the most severe wear because the surface of the gear may have rough spots or carburized material of unequal hardness. Therefore these blades may wear a considerable amount and throw the resulting load on the next blade and so on until the center blade will be doing the cutting. Even when the center blade is doing the cutting, the adjacent blades are rubbing on the surface of the gear prior to its contact with the center blade and it is therefore protected from abuse. This accounts for a considerable amount of the extra life of the rotary gear cutters of this invention. Thus the center cutting blades in my rotary tool may be considered as the finishing blades while the outer blades may be considered as roughing blades.

It should be pointed out that there is a fundamental difference betwen the cutting of gears with a rotary gear cutting tool, and a rack cutting tool and also a distinct difference between operating with crossed axes instead of parallel axes. With rack cutting the entire face width of the gear is in contact with the rack teeth in any position of the gear on the rack, and is in contact to a uniform depth of cut. Contrary to this, a gear in mesh with a rotary cutter set at crossed axes is in tight mesh only at the center where the two axes cross. Due to the elasticity of metals and the pressure applied, the contact represents a band of contact such as occurs when two cylinders are in contact with crossed axes. The point immediately over the center of crossed axes is the point of greatest depth of contact when cutting and this shades or tapers off in the width of the band of contact until the gear face entirely leaves the cutter face, and the cutter under these circumstances will make no mark beyond the band of contact. If a gear is reciprocated along a rack sufficient to repreesnt a distance greater than the circumference of the gear, the entire face of the gear is brought in contact with the rack teeth and is shaved. Even though a gear were rotated with a rotary cutter on crossed axes indefinitely, it would only contact on a band on each tooth represented by the band of contact between the crossed axes, being a very much wider band for small crossed axes and a much narrower band for obtuse crossed axes. Thus, whereas gears can be shaved without any lateral movement on a rack except to spread the wear on the rack, it is impossible to do this on rotary cutting with crossed axes. In rotary cutting an axial feed of the work is required in order to spread the contact of the tool and the work across the entire face of the gear.

Due to the fact that the contact between the gear and the rotary cutter on crossed axes is a concave surface, the edges of the blades on the tool in the center of the band cut deeper than edges of the blades more adjacent to the edges of the band of contact and former edges therefore become finishing edges, and the latter edges can be considered as roughing edges. This materially increases the life of the cutter as the rough surfaces of the gear are first removed by the outer edges on the edge of the band of contact, and the surface is finally finished by contacting the center edges in the middle of the band of contact. It is well recognized that the contact between cylinders on crossed axes has a profile which is not truly circular but is more nearly elliptical in profile. This is also true of the contact between a rotary cutter and the gear with crossed axes relation. It has been determined definitely that the cutter profile must be varied from an involute profile by a considerable extent in order to produce on the gear a true involute curve.

Figure 14:
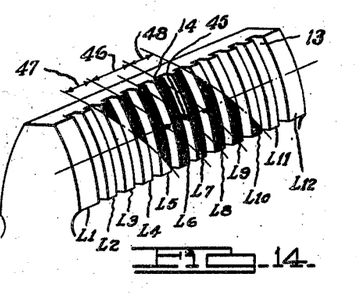
Figure 14 is a diagrammatic representation of one tooth of a helical cutter of the type shown in Figure 1 illustrating the cutting action.

It was heretofore pointed out that the band of contact of a helical gear with a mating gear is at an angle to the plane of rotation. This is a characteristic feature of my improved cutting tool where the teeth are helical. Thus when the tool of Figure 1 is being used to cut a work gear with a crossed axes relationship of 15° for example, not all of the edges of the serrations are actually being used for cutting. Figure 14 is a diagrammatic representation of a serrated tooth of the cutting tool with the serrations 13 and intermediate lands 14. The band of contact is represented by a shading. Assuming for example that there are twelve lands on each tooth face and that the center of the crossed axes is at the center of the tooth as shown at 45, it will be observed that the diagonal band of contact passes across the cutting edges in the central portion of the tooth but that only certain portions of most of the cutting edges are in the band. The lands are designated as $L_1$ to $L_{12}$. Lands $L_6$ and $L_7$ are effective for substantially the entire distance from tip to root. $L_3$, $L_4$, and $L_5$ have the upper portions only within the band of contact while $L_8$, $L_9$ and $L_{10}$ have only the lower portions effective. The outside lands $L_1$, $L_2$, $L_{11}$ and $L_{12}$ are practically without cutting effect when the center of crossed axes is at the point 45. The effective portions of the cutting teeth as indicated above may be subdivided into those portions which do the preliminary roughing and those that do the final finishing. This is diagrammatically illustrated by subdividing the band of contact into the finishing zone 46 and the outside roughing zones 47 and 48. The cutting edges within these zones function as finishing and roughing blades respectively.

Figure 15:
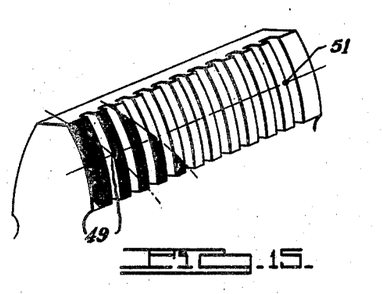
Figure 15 is a similar diagram illustrating the cutting action of the cutter when used for shoulder cutting.

One of the important uses for the improved rotary cutting tool is in shoulder cutting, that is finishing a gear which is closely adjacent another gear of larger diameter or some other obstacle which prevents the normal axial feed when the crossed axes are at the center point 45. It then becomes necessary to adjust the cutter on its arbor so that the center of the crossed axes is near one edge of the tool as indicated at 49, Figure 15. In this case the band of contact on the tool is at one side only and the remainder of the tool is inactive. However by reversal of the tool, end for end, the center of the crossed axes may be placed at the corresponding point 51 at the opposite end.

Figure 16:
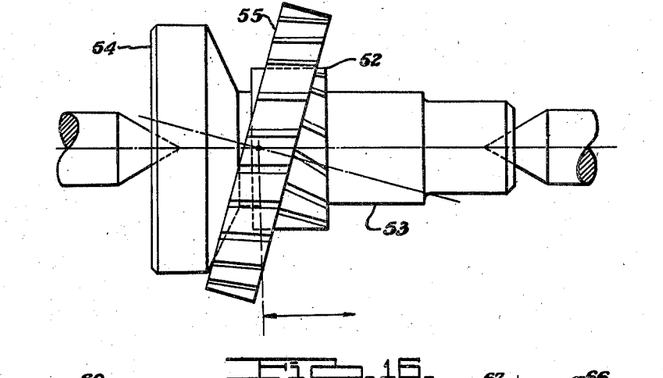
Figure 16 is a diagrammatic plan view of a cutter and a work gear arranged for shoulder cutting.

Figure 16 illustrates a cutting tool in operative relation to the gear 52 on the cluster gear 53. The adjoining gear 54 is so located as to require shoulder cutting. The crossed axes center for this operation is preferably set about $\frac{1}{16}$ to $\frac{1}{8}$ of an inch from the face 55 of the cutter adjacent the gear 54. In this type of work the serrations in the cutter normally vary in width from .015 to .060. Usually it is advantageous to make the land adjacent the side 55 of extra width because of the extra dutly called for in being immediately adjacent to the crossed axes. This end land is normally from .035 to .100 in thickness. There is a tendency for a rotary cutter used for shoulder cutting to give a tapered tooth form on the work gear so that the chordal thickness is greater at one end than at the other. To overcome this, it is possible to adjust the cutter edge so that one side operates with correct angle on the work gear, but this changes the opposite side of the work gear tooth quite materially. To overcome the latter change, it is sometimes found desirable to make a rotary gear cutter with a different spiral angle on the two sides of the cutter teeth so that when the operation is performed as above described, the work gear tooth is shaved to the correct angle on both sides of the teeth. This is illustrated in Figure 24 where the numeral 76 represents one side of the cutter teeth and the numeral 77 the other side, thus giving a cutter tooth which is thicker at the end 78 than at the end 79.

It is sometimes necessary to shave a gear with a circular slot which interrupts the work gear teeth as illustrated in Figure 21 at 80. During the feed movement parallel to the axis of the work gear 81, it will be apparent that the teeth on the cutter must cross the slot 80, and when the cutter teeth attempt to enter the tooth spaces on the opposite side of the slot, there is danger that the cutting edges of the gear teeth may be broken. It is therefore desirable to have some guiding action to enable the angle to be held correctly while the center of the cutter 82 crosses the slot. One method for accomplishing this result consists in providing the cutter 82 with a guiding gear 83 which will be in mesh with the work gear teeth while the cutter teeth 82 are crossing the circular slot 80. The center of crossed axes is at the point 84. In accordance with the theory of crossed axes cutting heretofore discussed, it will be apparent that the farther the distance is from the center of the crossed axes, the greater the diameter of the guide gear 83 must be in order to maintain contact with the work gear teeth. Also it is known that the helical angle on the guide piece must be different at such points as are axially spaced from the center of crossed axes. Therefore the helical angle of the guide gear 83 is made slightly different than the helical angle of the cutter 82 and the outside diameter of the guide gear 83 is slightly greater than the cutter 82.

Figure 17:
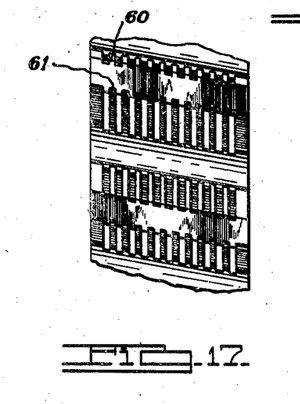
Figure 17 is a fragmentary edge view of a modified form of helical cutter.

In the rotary cutting tool illustrated in Figures 1 and 22, the serrations on opposite sides of the gear teeth are shown directly opposite each other, but it is sometimes desirable to change this relation to form a staggered effect with the serration on one side opposite a land on the opposite side. This is shown in Figure 17 in which it will be observed that the lands 60 on one side are opposite the serrations 61 on the opposite side.

Figure 18:
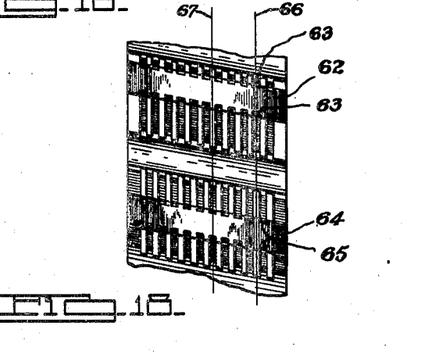
Figure 18 is a similar view of another modified form of helical cutter.

Another modified form of cutting tool is indicated in Figure 18 where the relationship of lands and serrations on each tooth are as shown in Figure 1, but the arrangement on successive teeth is different. Thus as shown, the tooth 62 of the cutter has serrations 63 in the same plane of rotation 66 but the adjoining tooth 64 has its serrations 65 arranged in a different plane of rotation 67. In the operation of such a cutter each successive cutting tooth has its cutting effect at a slightly different point in the cycle of rotation.

Figure 19:
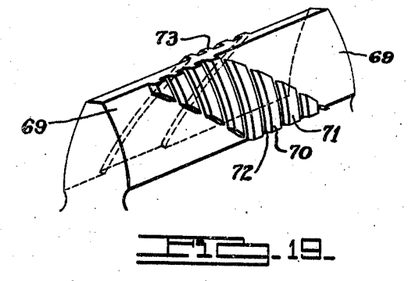
Figure 19 is a diagram of a gear tooth on a modified form of cutter.

Another modified form of cutter is indicated in Figure 19. In this modification the tooth 68 of the cutting tool has the portions thereof not forming the band of contact cut away or relieved as indicated at 69, leaving in elevation a diagonally disposed zone 70 of substantially the same contour as the band of contact. This zone 70 is provided with alternate lands 71 and serrations 72. The opposite side of the gear tooth has a similar raised zone 73 which however extends diagonally in the opposite direction from the zone 70 in the same manner as does the band of contact. With a cutter of this type the angle of the raised zone is determined in accordance with the helix angle of the cutter and the crossed axes setting.

Figure 20:
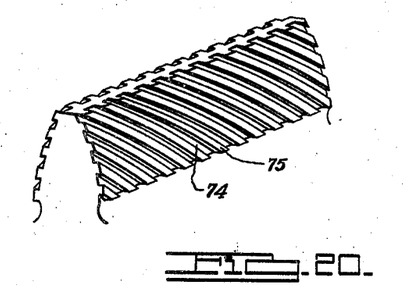
Figure 20 is a similar view of another modified cutter.

A further modified form of cutter is shown in Figure 20. Here instead of having the cutting edges substantially parallel to the plane of rotation of the cutter, they are arranged at a substantial angle thereto. This angle may be varied from a slight inclination to a considerable inclination. Desirably the angle may be substantially the same as the angle of the band of contact and Figure 20 shows this general relationship. 74 represents the inclined serrations and 75 the intermediate lands.

In the previous description in connection with Figure 1, it was stated that it is generally desirable to strengthen the rotary cutting tool by having the end lands 15 of greater thickness than the intermediate lands. In some cases, however, this may not be necessary and the rotary cutting tool may have the end lands of the same thickness as the intermediate lands, as illustrated in Figure 22.

The gear cutter of my invention has the profile of the teeth of general involute form, but it has been found desirable to make many modifications wherein the profile is not a true involute but is suitably changed in order to cut a work gear to the exact tooth profile desired. One such modification is made when it is desired to shave gears with complete relief of the profile so that they will not contact from the pitch line to the top of the tooth. In order to provide a suitable gear cutter for such gears it is necessary to modify the profile of the cutter teeth not only to conform with the new shape of the work gear tooth but also to provide for the amount of material to be removed from the work gear tooth. This extra material which must be removed requires a very heavy leverage of the teeth of the cutter against the work gear teeth and this in turn will cause a deformation in the work gear teeth unless the profile of the gear cutter is suitably modified to prevent such deformation. Therefore the gear cutters of my invention are provided with a modified tooth profile adapted to compensate for the above described condition, the result being that when my gear cutter is used for the type of work referred to, the final work gears will be of the desired contour and very accurately finished.

A modification of the tooth profile of the cutter is sometimes necessary to correct conditions in the work gear due to the heat treatment subsequent to finishing. It has been found that the heat treatment of a gear after finishing will change the profile of the gear tooth, usually by slightly increasing the tooth thickness at the top of the tooth. When it is known that the particular work gears to be operated upon have this tendency to change under heat treatment, it is desirable to provide a gear cutter having the tooth profile modified to remove an extra amount of material from the work gear teeth near the tops thereof. Upon subsequent heat treatment, the work gear teeth thereupon change sufficiently so that the final tooth profile is according to the desired pattern.

Since my gear cutters are adapted for finishing gears of various types, it often happens that in one particular type of gear to be finished there are different conditions encountered than with another type of work gear. In some cases the length of contact between the cutter tooth and the work gear tooth is less than in other cases and it has been determined that where there is a decreased length of contact, the leverage action of the teeth against one another causes a slight modification in the profile of the work gear teeth. To compensate for this the tooth profile of my gear cutters is modified in order that the desired profile of the particular work gear under consideration may be obtained with extreme accuracy.

It is sometimes desired to shave gears with my gear cutters leaving excess stock at the pitch line with less at the top and bottom of the tooth. Under such conditions the tooth profile of my gear cutter is suitably modified to compensate for this curvature.

Rotary gear cutters made in accordance with my invention are desirably made in such a way that they may be readily reground to a smaller operating pitch diameter and used for further cutting operations. This is illustrated in Figure 23. When the cutter is first manufactured it is provided with large addendum and deep serrations, the latter being indicated by the dotted line 85 in Figure 23. Thus when the cutter is first ground, the line $B_1$ represents the addendum, the line $A_1$ represents the tooth profile and the line $C_1$ represents the operating pitch line. After the cutter has been used to such an extent that the cutting edges are dulled, it may then be reground on the outside diameter to the line $B_2$ and the profile of the teeth may be reground to the line $A_2$. Under such conditions the operating pitch line will be represented at $C_2$. It is unnecessary to change the depth of the serrations when regrinding. The cutting tool may then be used for new gear cutting operations until the cutting edges again become dulled, whereupon it may again be reground to dimensions corresponding to lines $B_3$ and $A_3$ giving an effective pitch line $C_3$. By properly proportioning the original gear teeth on the cutter, it is readily adapted for five or six regrinds and after each grinding operation the cutting tool is as effective as when originally manufactured. It will be obvious from the above description that the serrations in my improved cutting tool provide not only for chip clearance and chip relief, but also for the regrinding of the profile to a smaller pitch diameter.

As previously mentioned, the surfaces forming the serrations are preferably unground following heat treatment. This causes the surface within the serrations to have a higher degree of hardness than the finished surfaces. Thus where a cutter is manufactured of heat treated steel, such that the finished surfaces have a hardness between 62 and 64 Rockwell, the hardness of the unfinished surfaces within the serrations will normally have a hardness as high as 70 Rockwell or more.

It was also pointed out previously that the root relief between the teeth of the cutter is preferably in the form of a transversely extending cylindrical hole 12. This is of sufficient size to properly act as avenues for the flow of oil past the cutter to assist in carrying off the chips. In normal operation oil is forced against these holes thereby driving the chips off the face of the tool, and the combination of oil flow and the high speed rotation of the cutter effectively throws off all chips at once. The provision of cylindrical relief slots at the bottom of the teeth is also advantageous for the reason that it is necessary to have such relief in order to properly machine the serrations in the sides of the teeth. The relief is of sufficient size so that the serrating tool runs out into a clear space at the bottom of the tooth and prevents damaging of the serrating cutter.

In the general description of the rotary gear cutter shown in Figure 1, a preferred relationship between the width of the serrations and lands was given, but the invention is not limited to this exact construction. In general it is preferable to maintain the lands between .020 and .040 and the gashes between .025 and .060. The enlarged end lands are normally maintained between .060 and .100. It is desirable to keep the width of lands within the dimensions given above in order to prevent burnishing action. The width of the gashes is determined by the amount of chip clearance desired and by the amount of material which it is desired to allow to be forced in between the lands to determine the cutting action. Where the cutter is designed for heavy rough cutting action the gashes are made wider than for lighter finishing action.

It should be noted that in the operation of the cutter a cutting action takes place on both sides of the gashes, although more cutting is done on one side.

In a cutter designed for normal operations it is usual to employ not less than 6 serrations nor more than 15. The normal width of a gear cutter is ¾ of an inch but this may also be varied under different circumstances. In most cases, however, the widths will vary from ½ inch to one inch. There is also a preferred relationship between the outside diameter of the gear cutter and the other dimensions.

One typical gear cutter made in accordance with my invention has an outside diameter of 7 inches, a thickness of ¾ of an inch and inside diameter of 2½ inches, a helix angle of 10°, serrations and lands of .035 width and serration depth of .035. Such a cutter is ideally suited for finishing a 4 inch diameter gear with a width of 1¾ inches and helical teeth of 25°. The cutter is preferably of opposite hand to the gear, as for example, a 10° left hand cutter with a 25° right hand gear. When the cutter and gear are properly meshed, the axes are crossed at an angle of 15°. The above dimensions are given merely by way of example and may be considerably modified under different conditions of operation.

The serrations in the cutter teeth are preferably of substantially the same curvature as the profile of the lands, as indicated in Figure 23 for example. However, it is not essential that the profile of the bottoms of the serrations should be curved and they may if desired be entirely straight as indicated in Figure 25 by the line 85. Also they may be curved as indicated in Figure 26 by the numeral 86, thus giving a tapered effect to the serrations. It is obvious also that the serrations may be ground after heat treatment if desired.

What I claim as my invention is:

1. A rotary gear finishing tool comprising a rotary gear having teeth on the periphery thereof, the sides of said teeth having a plurality of substantially parallel serrations extending from the tops to the roots of said teeth forming cutting edges, the sides of said teeth intermediate said serrations forming guiding surfaces, the profile of said gear teeth being of substantially involute form modified therefrom by being hollow at and near the pitch line to an extent ranging from .0003 to .0015 inch to correct for the excess cutting and to provide the desired form of involute on the work gear when said cutter is rolled in mesh with a work gear and a relative feed movement is given parallel to the axis of the work gear.

2. A rotary gear finishing tool comprising a rotary gear having teeth on the periphery thereof, the sides of said teeth having a plurality of substantially parallel serrations forming cutting edges, the profile of said teeth being of substantially involute form, but modified therefrom by being slightly hollow on the pitch line to correct for excess cutting, so as to provide the desired form of involute on the gear being finished.

3. A gear finishing tool comprising a solid rotary gear having a plurality of teeth on the periphery thereof, the sides of said teeth having a plurality of substantially parallel serrations extending from the tops to the roots of said teeth and forming cutting edges, the sides of said teeth intermediate said serrations forming guiding surfaces, the widths of said serrations and said guiding surfaces being on the order of 30 to 40 thousandths of an inch, a channel at the roots of the teeth slots between adjacent teeth, said channel extending further into adjacent teeth than do said serrations, said teeth being of substantially involute form but being modified therefrom by being slightly hollowed at and near the pitch line to correct for excess cutting at that point.

4. A gear finishing tool comprising a rotary gear having a series of teeth adapted to mesh with a rotary gear to be finished, and to generate thereon a desired contour, serrations on said teeth providing alternate lands and grooves, the edges of said lands providing cutting edges, the profile of said teeth being substantially conjugate to the desired profile on the teeth of the gear to be finished, but modified from the true conjugate by being slightly hollow adjacent the pitch line thereof.

5. A rotary gear cutting tool comprising a gear-like member having a plurality of teeth, said teeth having a plurality of substantially parallel grooves extending from the tops to the roots of said teeth and forming therebetween a plurality of lands, the edges of said lands forming cutting edges, arcuate channels extending transversely through said tool between adjacent teeth at the roots thereof, and extending laterally into said teeth to a substantially greater depth than do said grooves.

6. A rotary gear cutting tool comprising a gear-like member having a plurality of teeth, said teeth having a plurality of substantially parallel grooves extending from the tops to the roots of said teeth and forming therebetween a plurality of lands, the edges of said lands forming cutting edges, cylindrical channels extending transversely through said tool between adjacent teeth at the roots thereof, and extending laterally into said teeth to a substantially greater depth than do said grooves.

7. A rotary gear cutting tool comprising a gear-like member having a plurality of teeth, said teeth having a plurality of substantially parallel grooves extending from the tops to the roots of said teeth and forming therebetween a plurality of lands, the edges of said lands forming cutting edges, arcuate channels extending transversely through said tool between adjacent teeth at the roots thereof, and extending laterally into said teeth to a substantially greater depth than do said grooves, said channels being completely open at their ends to provide for an unobstructed flow of fluid during the cutting operation.

8. A rotary gear cutting tool comprising a gear-like member having a plurality of teeth, said teeth having a plurality of substantially parallel grooves extending from the tops to the roots of said teeth and forming therebetween a plurality of lands, said grooves and said lands being on the order of thirty to forty thousandths of an inch in width, the edges of said lands forming cutting edges, smoothly rounded channels extending transversely through said tool between adjacent teeth at the roots thereof, and extending laterally into said teeth to a substantially greater depth than do said grooves, said channels providing a passage for oil and chips into which said grooves open freely.

ROBERT S. DRUMMOND.